UNITED STATES PATENT OFFICE.

FREMONT SCOTT, OF LOS ANGELES, CALIFORNIA.

CULINARY ARTICLE.

990,168.     Specification of Letters Patent.     Patented Apr. 18, 1911.

No Drawing.     Application filed June 7, 1910. Serial No. 565,614.

*To all whom it may concern:*

Be it known that I, FREMONT SCOTT, a citizen of the United States, residing at Los Angeles, California, have invented a new and useful Culinary Article, of which the following is a specification.

My object is to prepare a culinary article to be sold through the trade for making ornamental icings (royal, plain and the like), frostings for pies, cakes and other fancy pastries, and for making ornamental and fancy designs for molded or brick ice cream and the like.

In preparing my culinary article I proceed as follows: If it is desired to make about one gallon of the culinary article for the market, take 2½ ounces of egg albumen and soak it in water over night, take 4 ounces of white gelatin and soak over night in 1½ quarts of cold water, take 4 ounces of soap bark and 3 quarts of boiling water and steep slowly for thirty minutes, and after all the ingredients are cooled strain each article through a cloth, then mix thoroughly and strain the mixture through a canton flannel bag. Add 1 teaspoonful of acetic acid and 1 tablespoonful of lemon extract, then let it set until it is thoroughly cooled and forms a jelly. The mixture may be put up for the market in jars of any desired size, and is ready for use. Thus the ingredients are compounded which enter into the meringue jelly. The product is a homogeneous mass of gelatinous consistency which has a straw color and a pleasant taste and odor. When cooled to about 70 degrees Fahrenheit it congeals to a gelatinous mass, and when heated to 100 degrees it becomes a thick liquid. If the resulting liquid be whipped it produces a thick, abundant, white froth. When the whipped froth is baked it produces a porous, spongy mass which does not cling to the knife or crumble when cut.

The culinary article when prepared ready for the market contains the ingredients specified in about the following proportions: 2% egg albumen; 4% white gelatin; 4% soap bark; a trace of acetic acid and a trace of lemon extract, and 90% water. This culinary article is a compound containing all the elements desirable for producing the ornamental effects heretofore produced by whipping the whites of eggs.

When it is desired to make pies put a quantity of my improved culinary article in a whipping bowl, set the bowl in hot water and heat to about 60 or 65° Fahrenheit. Then beat stiff with a wire whipper the same as though egg white was being used. Add an equal amount of powdered sugar and beat well, cover the pies with the mixture and brown in a moderately heated oven.

When it is desired to make royal icing for cake take ½ cup of the culinary article beat stiff, add 1 pound of 6 X powdered sugar, 1 teaspoonful extract, beat stiff and cover the cakes thinly with a palette knife. Use a rubber pastry bag and ornamental tubes to create any fanciful designs, letters or figures desired on the cakes, and set the cakes on the oven door to dry.

When it is desired to ornament mold or brick ice creams use ornamental molds, fill designs in the molds with royal icing prepared as above, fill body of the mold with cream, dip the mold in boiling water or wrap in a hot cloth for one minute and then remove from the mold.

I claim:

1. A culinary article containing about 2% egg albumen; 4% white gelatin; 4% soap bark; a trace of acetic acid; a trace of lemon extract, and 90% water, forming a compound of gelatinous consistency, having a straw color and a pleasant taste and odor, and when cooled to about 70 degrees Fahrenheit congeals to a gelatinous mass and when heated to 100 degrees Fahrenheit becomes a thick liquid, which when whipped becomes an abundant white froth, which on being baked produces a porous, spongy mass that does not cling to the knife or crumble when cut.

2. A culinary article containing about 2% egg albumen; 4% white gelatin; 4% soap bark; 90% water and a suitable flavoring material and forming a compound of gelatinous consistency having a straw color and a pleasant taste and odor, which when cooled to about 70 degrees Fahrenheit congeals to a gelatinous mass, and when heated to 100 degrees Fahrenheit becomes a thick liquid and which when whipped produces a thick, abundant white froth, which on being baked produces a porous, spongy mass that does not cling to the knife or crumble when cut.

FREMONT SCOTT.

Witnesses:
IDA M. DASKAM,
J. R. BRADY.

Copies of this patent may be obtained for five cents each, by addressing the "Commissioner of Patents, Washington, D. C."